No. 882,450. PATENTED MAR. 17, 1908.
F. E. BRAZEAL.
TROLLEY.
APPLICATION FILED JUNE 15, 1907.
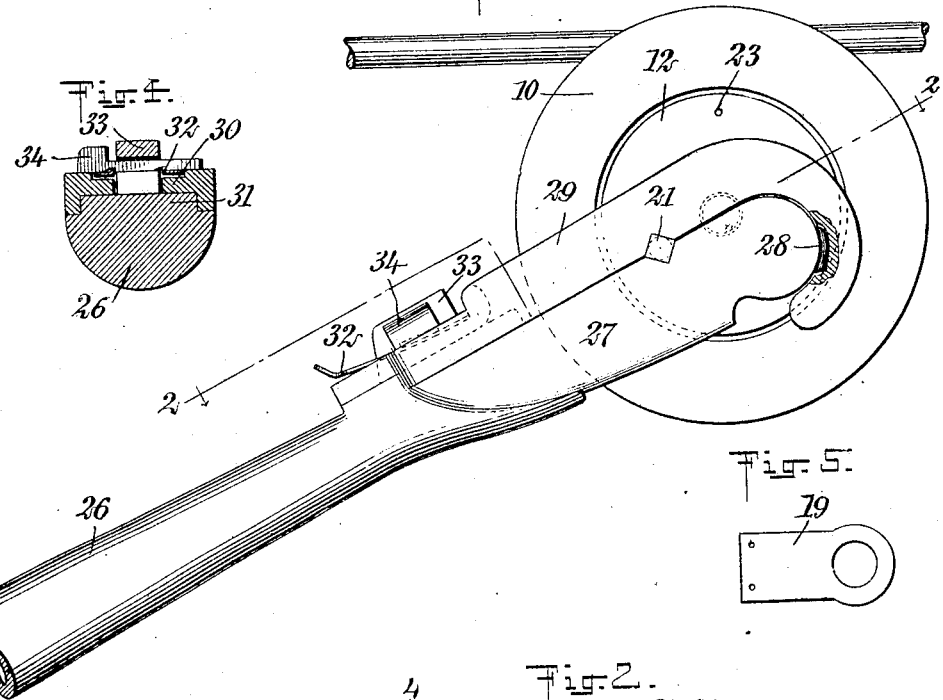
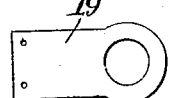
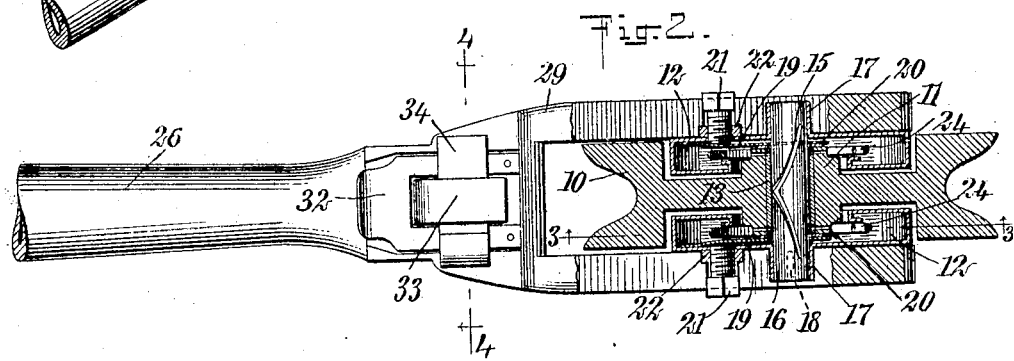
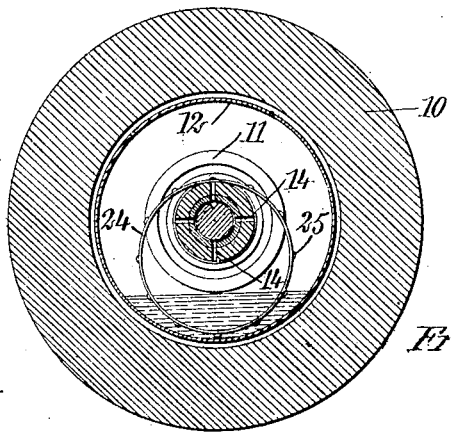
WITNESSES
INVENTOR
Frank E. Brazeal
BY Munn & Co
ATTORNEYS

UNITED STATES PATENT OFFICE.

FRANK E. BRAZEAL, OF MONSON, MASSACHUSETTS, ASSIGNOR OF ONE-HALF TO HERMAN S. MOWRY, OF NORTH ADAMS, MASSACHUSETTS.

TROLLEY.

No. 882,450.

Specification of Letters Patent.

Patented March 17, 1908.

Application filed June 15, 1907. Serial No. 379,127.

*To all whom it may concern:*

Be it known that I, FRANK E. BRAZEAL, a citizen of the United States, and a resident of Monson, in the county of Hampden and State of Massachusetts, have invented a new and Improved Trolley, of which the following is a full, clear, and exact description.

The invention has in view, primarily, first, to provide a trolley wheel which will for extended periods be properly and automatically lubricated, whereby the life of the wheel and its bearings will be materially lengthened; and second, to so connect the trolley wheel with the forked end of the trolley pole that it may be easily and readily detached and replaced without the use of tools, as for adjustment, the renewal of parts, or for other purposes. These objects I attain by a simple and compact construction, one embodiment of which is hereinafter disclosed.

Reference is to be had to the accompanying drawings, forming a part of this specification, in which similar characters of reference indicate corresponding parts in all the figures.

Figure 1 is a side elevation of my improved trolley; Fig. 2 is a sectional plan of the same substantially on the line 2—2 of Fig. 1; Fig. 3 is a section through the trolley wheel on the line 3—3 of Fig. 2; Fig. 4 is a cross section on the line 4—4 of Fig. 2, and Fig. 5 is a plan of a spring contact member forming an element of the construction.

In the construction of my improved trolley, I employ a trolley wheel 10 which is provided with annular grooves at opposite sides concentric with the hub 11, which receive lubricating reservoirs 12. The hub of the wheel is preferably lined with a Babbitt or other anti-friction bushing 13, and is constructed with radiating oil holes 14 formed in its extended ends which register as the wheel revolves, with an angular oilway 15 formed in the circumference of a shaft or axle 16 on which the trolley wheel is journaled.

The construction of the lubricating reservoirs 12, is best shown in Figs. 2 and 3.
Each consists of a cylindrical box 17 which snugly fits one end of the axle 16, to which it is preferably keyed as indicated in dotted outline in Fig. 2, at 18. The inner wall of each reservoir 12 is turned inwardly and bent upon itself to provide sufficient clearance around the projecting end of the hub 11. The inner face of the opposite wall has attached thereto a spring contact piece 19, shown in detail in Fig. 5, the same being provided with a ring at its free end, which is designed to be passed over the axle 16 and bear upon a washer 20 interposed between it and one end of the hub. For obtaining the proper bearing between each contact piece 19 and its respective washer 20, in order that the current from the wheel may be properly conducted down the pole, I provide a set-screw 21 which is threaded through a boss 22 formed eccentrically at the outside of the reservoir 12.

At the top of each reservoir 12, an oil-hole 23 is formed as shown in Fig. 1, for filling the reservoir with lubricant at proper periods, the same collecting to the height in the bottom of the reservoir substantially as represented in Fig. 3, and being automatically transferred during the revolution of the wheel to the oilway of the axle through the oil-holes 14, by an oil-ring 24 which is suspended from the extended end of the hub and is preferably provided with stamped protuberances 25 projecting from its circumference.

The trolley-pole 26 is provided with the usual forked end 27, the branches of which may be rounded off at their extremities, as best shown in Fig. 1, and provided with projections or keys 28, the rounded extremities of the fork and keys being engaged when the trolley is assembled, by the hook members of a yoke 29, the under edge of said yoke and the top edge of said fork each being cut out an equal extent for the reception of the projecting portions of the reservoirs 12 and the heads of the set-screws 21, thus securing the trolley-wheel and reservoirs centrally of the yoke and fork and holding the axle 16 and the reservoirs in fixed relation to the trolley-pole.

The inner end of the yoke 29 is provided with a slotted connecting member 30 of reduced thickness to fit flat upon the raised or keyed portion 31 of the pole 26, and carries a slotted spring 32 on its upper face, through which passes, as also through the connecting member 30, a lug 33 projecting from the upper face of the elevated portion 31, said lug being crosswise slotted for the reception of a key 34.

It is apparent from this construction that the yoke may be easily and readily displaced without the use of tools when desired to remove the trolley-wheel, and also that the trolley-wheel will be properly and automatically lubricated for extended periods, whereby the life of the bearing parts will be materially lengthened and friction reduced to a minimum.

The trolley shown and described, although being my preferred practical embodiment, may obviously be changed in numerous particulars within the scope of the annexed claims.

Having thus described my invention I claim as new and desire to secure by Letters Patent:

1. In a trolley, a trolley-wheel, lubricating reservoirs arranged at opposite sides of the wheel, contact pieces within said reservoirs, and means for adjusting said contact pieces exteriorly of the reservoirs.

2. In a trolley, a trolley-wheel having lubricating reservoirs stationarily supported at the opposite sides thereof, contact pieces carried within said reservoirs, and set-screws threaded through said reservoirs for adjusting said contact pieces.

3. In a trolley, a trolley-wheel, an axle upon which the trolley-wheel is revolubly mounted, lubricating reservoirs attached to the opposite ends of said axle, a trolley-pole having a fork, and a yoke for holding said reservoirs against relative movement and detachably connecting the wheel with the fork.

4. In a trolley, a trolley-wheel, lubricating reservoirs arranged at the opposite sides of the wheel, contact pieces within the reservoirs, set-screws for adjusting said contact pieces, a trolley-pole having a fork, and a yoke detachably connecting the wheel with the fork, engaging said reservoirs and said set-screws.

5. In a trolley, a trolley-pole having a fork provided with rounded outer ends, a yoke seated on the fork conforming to and engaging the rounded outer ends of the fork at both the upper and under sides thereof, and means for detachably connecting the yoke to the inner end of the fork.

6. In a trolley, a pole having a fork provided with rounded extremities with projections formed thereon, a yoke having hooked members for engaging the rounded extremities of the fork and said projections, and means for detachably connecting the yoke to the inner end of the fork.

7. In a trolley, a trolley-pole having a fork, a yoke having hooked members for engaging the branches of the fork at the outer ends thereof, said yoke having a slotted inner end, a slotted lug projecting from the pole at the inner end of the fork adapted to pass through the slot in the yoke, and a key tight in the slot of the lug, forcing the yoke against the fork.

8. In a trolley, a pole having a fork, a yoke having means at its outer end for detachably engaging the extremities of the branches of the fork, said yoke having a slotted inner end with a flat spring secured to its upper face, a slotted lug projecting from the pole at the inner end of the fork, and a key adapted to be passed through the slot of said lug over the top of said spring.

In testimony whereof I have signed my name to this specification in the presence of two subscribing witnesses.

FRANK E. BRAZEAL.

Witnesses:
HENRY W. LANCEY,
HENRY SEWALL.